(12) United States Patent
Horton et al.

(10) Patent No.: US 10,510,020 B2
(45) Date of Patent: Dec. 17, 2019

(54) SEMANTICS DATA PROCESSING

(71) Applicant: Bluebird Labs, Inc., Boulder, CO (US)

(72) Inventors: Noah Horton, Boulder, CO (US); Bryce Daniel Chriestenson, Boulder, CO (US)

(73) Assignee: Bluebird Labs, Inc., Boulder, CO (US)

( * ) Notice: Subject to any disclaimer, the term of this patent is extended or adjusted under 35 U.S.C. 154(b) by 0 days.

(21) Appl. No.: 15/942,373

(22) Filed: Mar. 30, 2018

(65) Prior Publication Data
US 2019/0303801 A1 Oct. 3, 2019

(51) Int. Cl.
*G06N 20/00* (2019.01)
*G06F 17/27* (2006.01)

(52) U.S. Cl.
CPC ......... *G06N 20/00* (2019.01); *G06F 17/2785* (2013.01)

(58) Field of Classification Search
None
See application file for complete search history.

(56) References Cited

U.S. PATENT DOCUMENTS

| 7,403,956 | B2* | 7/2008 | Vaschillo | G06F 16/284 707/770 |
|---|---|---|---|---|
| 8,091,142 | B2 | 1/2012 | Liu et al. | |
| 9,576,147 | B1 | 2/2017 | McClintock et al. | |
| 2008/0184329 | A1 | 7/2008 | Cross et al. | |
| 2011/0113076 | A1 | 5/2011 | Jo et al. | |
| 2014/0172808 | A1 | 6/2014 | Burge | |
| 2014/0380404 | A1 | 12/2014 | Raj et al. | |
| 2015/0242619 | A1 | 8/2015 | Bender et al. | |
| 2016/0127379 | A1 | 5/2016 | Nayshtut et al. | |
| 2016/0132252 | A1 | 5/2016 | Bish et al. | |
| 2017/0053130 | A1 | 2/2017 | Hughes et al. | |
| 2017/0093916 | A1 | 3/2017 | Arumugam et al. | |
| 2018/0075104 | A1* | 3/2018 | Oberbreckling | G06F 16/254 |

OTHER PUBLICATIONS

U.S. Appl. No. 16/015,059, filed Jun. 21, 2018.

* cited by examiner

*Primary Examiner* — Alan Chen
(74) *Attorney, Agent, or Firm* — Davis Wright Tremaine LLP

(57) ABSTRACT

Techniques for deriving additional features from input data are described herein. Input data from a plurality of source files are received. One or more features corresponding to the input data, which includes information about semantic types, is identified. The input data is then processed to generate additional features for the input data. New data corresponding to the additional features are then generated and access to the new data is subsequently provided.

20 Claims, 10 Drawing Sheets

|  | Column X: Timestamp | Column Y: Zip Code |
|---|---|---|
| Column X: Timestamp | N/A | Derive Feature (e.g., Weather Temp) |
| Column Y: Zip Code | Derive Feature (e.g., Weather Temp) | N/A |
| Column Z: Timestamp | Derive Feature (e.g., Time Period) | Derive Feature (e.g., Wind Chill) |

FIG. 9

SEMANTICS DATA PROCESSING

BACKGROUND

Traditionally, the methods, processes, and algorithms used in data science to extract insight from data have largely been driven by human-input and intelligence. Administrators, such as data scientists, would look at a dataset and identify which columns of data might be meaningful and useful for analysis purposes. Often times, however, the dataset would include flaws (e.g., NULL values or ill-formatted values) that need to be cleansed or fixed prior to processing the dataset. Additionally, the columns of the dataset may need to be altered through normalization prior to processing, such as re-scaling a numeric column to go from 0.0 to 1.0 instead of from an arbitrary lowest to highest value.

In addition to cleaning and normalizing the columns in preparation for processing, in some instances, data scientists may want to perform operations on a dataset to derive additional columns of data. Deriving columns may be achieved by taking one or multiple input columns from a dataset and deriving new features from them. As an example, a data scientist may elect to use two timestamps (such as the date a project proposal was submitted and the date the project proposal was accepted) to derive a new "proposal review period" column that is the difference of the two timestamp columns. As another example, a data scientist may elect to use a date column to derive the month of the year as a new column for the dataset. This information is important in discovering patterns in the data.

Most machine learning algorithms are not designed to scale well for input data sets with a large number of features or columns, nor are they generally capable of deriving additional features from existing features without manual intervention. For example, techniques like linear regressions begin to fail with just a few dozen features. Furthermore, deriving additional features as described above has typically been driven by data scientists (e.g., humans) and can be time consuming, and thereby very labor intensive. The aggregate effect of these two factors is that far fewer features are used in data science than is optimal.

BRIEF DESCRIPTION OF THE DRAWINGS

Various techniques will be described with reference to the drawings, in which:

FIG. 9 illustrates an example dataset illustrating features and additional features associated with input data.

DETAILED DESCRIPTION

Figure 1:
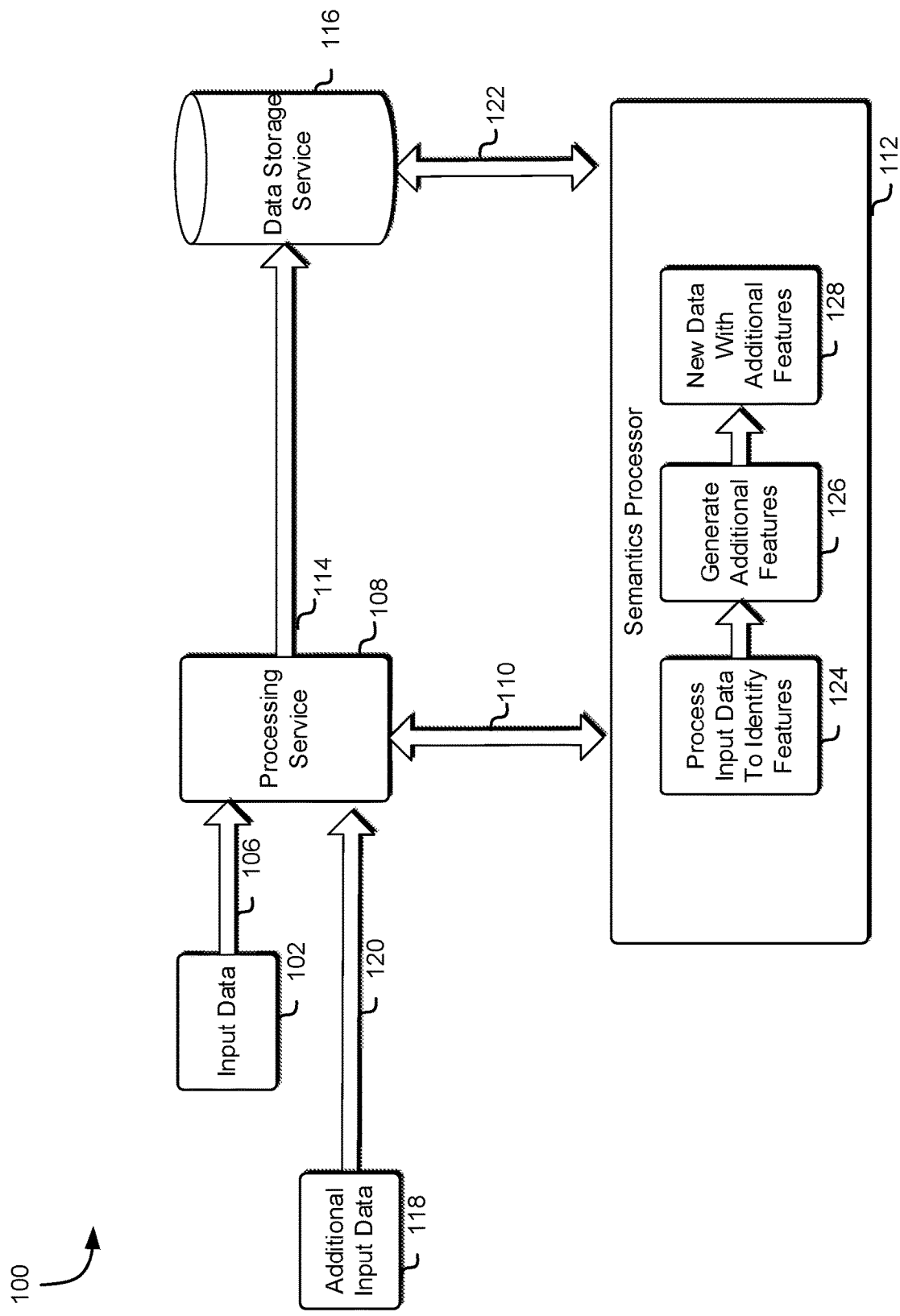
FIG. 1 illustrates an example environment where input data is processed.

This present disclosure relates to systems and methods for facilitating the derivation of additional features (e.g., data columns) associated with a dataset, based on the semantic context (e.g., actual or implied meaning or significance) of existing features in the dataset. Such additional features can then be used to provide an administrator or user, such as a data scientist, additional insight pertaining to the dataset. For instance, every column of a dataset may be annotated with basic pieces of information such as, its semantic type, its outcome variable, and how each column relates to other fields (e.g., other columns). These pieces of information may then be used to create, generate, or derive additional features, in some cases with different semantic contexts and/or types than those of the input feature(s), pertaining to the dataset. Specifically, the semantic type of a feature may describe the kind of information that the data in the features represents. The outcome variable may describe something that an administrator of the dataset renders important to track such as, a Key Performance Indicators (KPI) in a business environment related to revenue or cost of a product. The information about how each column relates to other fields may indicate the interdependencies or relationship between each of the columns in the dataset. For example, a zip code feature may be marked as containing information intimately correlated to the city and state features in the record.

All of these pieces of information may be identified from a dataset so that one or more particular subsets of the dataset may be identified as being associated with respective feature (s). That is, the information of the dataset may be used in a processing environment in order to identify certain features of data before data is processed by one or more semantic algorithms (e.g., feature derivation algorithms) for analysis. In some embodiments, this stage as well as the identification of the semantic contexts of features is executed manually (e.g. via input via a graphical or command-line interface), while in some embodiments, the pre-processing is performed programmatically using heuristics, etc. Datasets (e.g., input data or data from source files) may be obtained from various computing services or data stores and each of these datasets may contain columns of information with varying feature types. These varying feature types may then be identified and tagged to form a subset of the dataset. The subset of the dataset may subsequently be tagged and identified based on the semantic type declaration, semantic metadata, and/or semantic information of the input data. In some instances, the subset of the dataset may then be formatted, normalized, and/or cleansed before being sent to a semantics processor, for example, to apply algorithms that may derive many other additional features than the features that were present in the dataset when it was first obtained.

As a result, an automated processing technique such as one described herein would be an optimized method of deriving new features. A technical effect and advantage to the techniques described herein is the creation, and population, of a greater number of relevant features than would be feasible by the manual intervention of administrators (e.g., data scientists), while also lowering the defect rates pertaining to user error since the techniques described herein allow for a simple annotation of data and all other work is automated. Additionally, by virtue of the consideration of a practically unlimited number of input features, as well as being able to take advance account of their semantic context, the derived features are considerably more pertinent to the desired outcome (the semantic context of which may also be defined ahead of time) and result in more efficient processing of the overall data set by systems implementing machine learning algorithms (which may be the same system, or other downstream systems).

As mentioned, the mechanisms described herein provides a more efficient way to process large data set(s) with varying types of information (e.g., data sets with varying feature types) with little or no oversight and/or input by an administrator. Administrators typically have to manually identify or deduce features in a given dataset, as well as the informational relationships therebetween, for use as input for machine learning processing. This manual configuration requires detailed knowledge about the systems, the data itself, and/or their respective interdependencies and external dependencies. However, as the number, size, and complexity of the source files increase, the effort and knowledge required increases rapidly, and the deductive and/or inductive nature of this manual processing (i.e., working from the raw input data and imputing semantic meaning of various groupings perceived therefrom) necessarily results in poor scaling and incomplete and/or incorrect feature identification. Further, this is typically done every time the data is analyzed, leading to duplication of this extensive effort.

Thus, by providing a framework by which the high-level semantic contexts and relationships therebetween are definable in connection with the input data, the techniques described herein provide many technical advantages for processing data in a technical environment. That is, techniques described in the present disclosure facilitate the process of deriving additional features not by automating an existing manual process, but by integrating semantic information—context/meaning, type, etc.,—into a processing flow that has, to this point, required human induction and deduction to derive such semantic information from syntactic information (i.e., data types and groupings thereof, such as integers, strings, floats, and the like). In order to facilitate such processing, a system first obtains and processes input data from a file or multiple files. For example, when input data (e.g., from a source file or files) is received, a system identifies features pertaining to the input data. Identifying the features of the input data provides the system with information of how each column of the input data are related to one another.

Once identified, a subset of the input data can be tagged with semantic metadata—that is, metadata that includes or is otherwise associated with information that describes the semantic context/significance of each feature (e.g., rather than just identifying a feature as containing integers, identifying the feature as "temperature" with unit "Fahrenheit degrees")—and sent to a semantics processor which implements algorithms (e.g., heuristics, machine learning, etc.) that process the tagged input data to generate/derive additional features, based at least in part on the semantic metadata, based on a variety of factors. These factors may be driven by system configurations and/or predetermined user-defined policies (e.g., specifying a desired outcome, the manner in which a given input feature results in a derived feature, how identified features interrelate, etc.). The semantic metadata, in some instances, may include information with the predefined user-defined policies. The semantics processor may be configured, in an non-limiting example, such that it may process a practically unlimited number of input features simultaneously or in a short amount of time without negative scaling constraints (e.g., $O(n)$ or $O(1)$ scaling, rather than multiplicative, logarithmic, or exponential computational requirements to achieve linear time-to-completion relative to feature quantity and/or complexity) to generate new features in addition to the features already present in the input data originally obtained.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 where input data 102 is processed in accordance with an embodiment. Input data 102 may include a set of values in a column or multiple columns obtained from a file. As an example, input data 102 may contain a column or multiple columns with integer values that indicate a timestamp of when a particular customer purchased a product online. The column or columns would provide values pertaining to the date and/or time that the customer purchased a product online. In some instances, date and time may not be integer values but rather textual strings that refer to a month, day, and/or year.

In the example illustrated in FIG. 1, input data 102 may provide data 106 to a processing service 108. The data 106 may be provided from a computing service (not depicted in FIG. 1) either automatically based on system policies or may be directed by a user associated with the one or more computing devices (not depicted in FIG. 1). A computing device or a user in connection with a computing device may generate data related to the operation of a business or research project. For example, data may be generated or gathered using a computing device to track timestamps of a customer that purchases a product online or other such data related to purchasing products online.

It should be noted that, while the examples described herein refer to data pertaining to timestamps, other types of streaming data, streaming textual data, non-streaming data, and non-streaming textual data may also be processed using the techniques described herein. For example, a corpus of English text from, for example, a collection of books and their titles may be similarly collected using the techniques described herein. It should also be noted that, while the examples described herein are based on a solution to the problem of dynamically deriving new and additional features based on a collection of data, the techniques described herein may also be used to, for example, gather statistics on the data, analyze trends in the data, produce reports about the data, or other such operations. For example, the processes illustrated below deriving additional features of input data may also be used to search for all occurrences of a specific data item in the data, and thereby produce a frequency count of elements for that particular data item in the dataset.

As shown in FIG. 1, a processing service 108 may receive input data 102 (e.g., one or more source files) on behalf of a user or administrator in connection with a computing device. In some instances, the processing service 108 may first process the data in the input data 102 to properly clean or normalize the values contained therein. That is, the processing service 108 may, in some instances, do some cleaning, normalizing, and/or formatting of the data before other processing is performed on the input data 102.

The processing service 108 may be a service or a computing device provided by a computing environment 100 that receives, obtains, or sends a request for the input data 102. The processing service 108 may receive the input data 102 using a direct connection such as, for example, a network connection either via a wired or wireless connection. The processing service 108 may also receive the input data 106 by, for example, interfacing with a separate service, monitoring one or more network addresses, monitoring a storage location, or subscribing to a data notification service.

The data storage device 116 (e.g., data store) may be configured to push or provide data 122 based on system policies or it may be provided based on a user's input in connection with other computing devices in the computing environment 100. The processing service 108 may obtain the input data 102 and elect to send 114 the input data 102 for storage in a data store 116, a buffer, or a cache before any processing is performed on the input data 102. That is, in the example illustrated in FIG. 1, the processing service 108 may provide the input data 102 for storage in a data storage service 116, which may be one or more storage locations provided by the computing environment 100. The data storage service 116 may include the same or entirety of data as the input data 102 or it may include a subset of the input data 102. For example, the data storage service 116 may include a filtered subset of the data, or it may include data for a predetermined time period, or may include some other subset of the input data 102 as predetermined by system configurations. The data storage service 116 may be a computing device configured to store data. In an embodiment, the processing service 108 and the data storage service 116 may be that of the same service and share the similar configurations. That is, the one or more computing device may actually send data 106 directly to the data storage service 116 which may incorporate the functionalities of the processing service 114, such as, receiving data 106.

In the example illustrated in FIG. 1, the processing service 108 receives the data from the input data 102 and processes the data 110 in a semantics processor 112 to identify features 124. Once the input data is processed and features identified, one or more subsets may be tagged for processing. The one or more subsets of the input data may be tagged based on the feature types of the data. The tagged set of data may then be processed by the semantics processor 112 to generate additional features 126 for the input data 102. Once the additional features have been generated, the semantics processor 112 may generate new data 128 to include the additional features. Subsequently, the generated new data 128 may then be sent from a semantics processor back to the processing service 108 or to a data storage service 116 for further processing. That is, the generated new data 128 may be used as an input again into the semantics processor 112 to generate yet more features or requested and used by administrators (e.g., data scientists) for additional insight into the input data 102 that was originally received. Each of these steps as described in FIG. 1 to derive additional features and generate new data is described in greater detail below in connection with FIGS. 2-9.

In an embodiment, the semantics processor 112 may also include functionalities such as cleaning and normalizing the data before processing. In another embodiment, the semantics processor 112 may be instructed upon by a user in connection with a computing device (not depicted in FIG. 1) to use the new data to identify additional features in the new data to derive even more features.

Although the example illustrated in FIG. 1 illustrates the semantics processor 112 as a separate processor from the processing service 108, in an embodiment, the semantics processor 112 may be the same as the processing service 108 and provides the functionality associated with the processing service 108 described herein. In the example illustrated in FIG. 1, the data received by the processing service 108 includes external input data 118 received from outside of the computing environment 100. That is, the external input data 118 may be from another administrator associated with computing devices of the computing environment 100, from services, applications, modules, or interfaces hosted outside of the computing environment 100, or from services, applications, modules, or interfaces configured to connect and/or communicate with the processing services 108 of the computing environment 100. In an embodiment, the external input data 118 comes from services, applications, modules, or interfaces hosted in an isolated private network (e.g., a virtual private network), but logically isolated from the other services 102 of the computing environment 100. In an embodiment, the semantics processor 112 may be implemented in a cloud computing instance (e.g., virtual machine, data bucket, etc.) in a virtual environment. That is, the semantics processor 112 may, in some instances, be spun up on-demand and implemented using a virtual machine supported by computing resources hosted by a computing resource service provider. The virtual machine may be spun up on-demand based on a request for a virtual machine from a processing service 108, from a user in connection with a computing device, or based on a service level agreement (SLA) of the computing resource service provider.

As further shown in FIG. 1, in an embodiment, the input data 102 and the external input data 118 may first be processed by the semantics processor 112 to generate additional features and, in turn, new data 128, such that the input data 102 and the external input data 118 and the new data 128 may in turn be all stored in the data storage service 116. However, in an embodiment, the data from input data 102 and external input data 118 may also first be stored in the data storage service 116 before being processed by the semantics processor 112. The data storage service 116 may be a storage device configured to store data, a buffer, and/or virtual storage hosted by a computing resource service provider.

Figure 2:
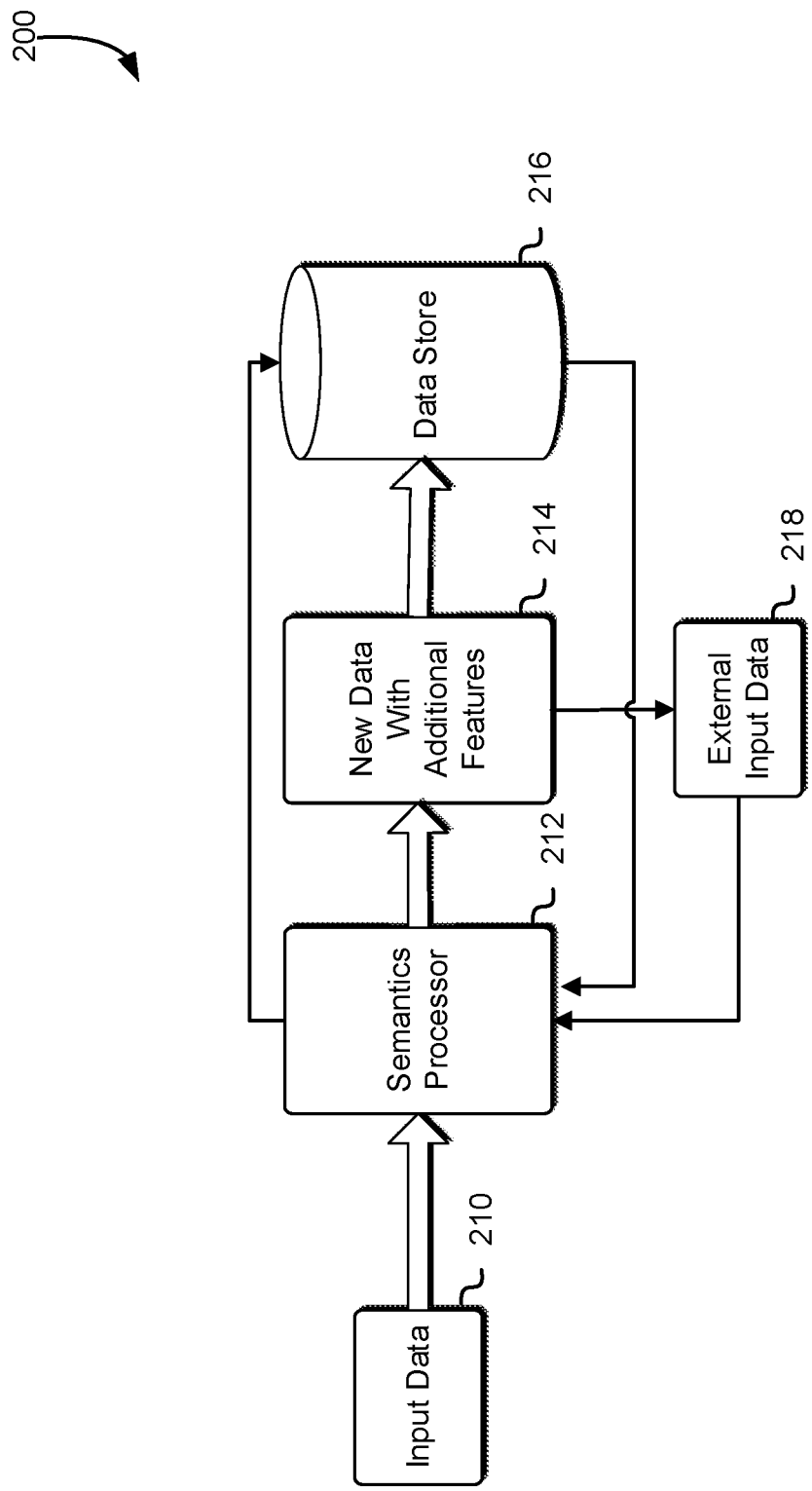
FIG. 2 illustrates an example environment where additional input data is processed.

FIG. 2 illustrates an example environment 200 where additional input data (e.g., external input data) is processed. As described above in connection with FIG. 1, FIG. 2 illustrates that external input data 218 may be requested by an administrator in connection with a computing device to join with newly generated data 214 after input data 210 has been processed by a semantics processor 212. That is, input data 210 may be obtained by a semantics processor 212 and features of the input data 210 may be identified. Once the features have been identified, a subset of the input data 210 may be tagged or identified to form a tagged subset. Once the subset of the input data 210 has been tagged, the semantics processor may process the tagged subset of input data 210 to generate additional features pertaining to the tagged subset of input data 210. In an embodiment, new data 214 or a new file containing new data may be generated to include at least the original input data 210, the original features identified with the input data 210, and also the new data 214 with the newly generated additional features that were derived based on the tagged subset of the input data 210.

In some instances, external input data 218 may be submitted to or obtained by a semantics processor 212 to process with the new data 214. That is, the semantics processor 212 may perform the same or similar operations as described in connection with the input data 210 mentioned above to derive even more additional features associated with the input data 210 and the external input data 218.

As an example, the input data 210 may include a column describing how many online purchases a customer makes on a daily basis. In another column, the column may indicate the purchase price of the online purchases that the customer makes on a given day. Additional features may be generated based on these two columns. That is, the semantics processor 212 may obtain the input data 210 with these two columns and derive one or more additional features for additional insight to the information. That is, for example, an additional feature derived may be an average price per item the customer made on any given day. Specifically, the average price the customer spends per day can be derived by the semantics processor 212 from these two columns of information. Once the one or more additional features have been generated, new data may be created to include the original two columns of information and then a new column of information pertaining to the average price of purchase for each day is also included. A new file may contain all of this information and be sent to a data store 216 for storage. In some instances, a data scientist in connection with a computing device may then request the new file or new data 214 from the data store 216 and perform one or more additional operations to the new file or new data 214 accordingly.

As further illustrated in FIG. 2, in some embodiments, the new data with this new additional feature 214 may elicit additional or external input data 218 to join in order to generate even more features. In an embodiment, the external input data 218 may include one or more columns that pertain to how long it takes for a customer to make an online purchase decision. In other words, the one or more columns in the external input data 218 may include timestamps of a customer in connection with how long it takes the customer to make a purchase while surfing the web. This external input data 218 may then join with the new data 214 and be sent to the semantics processor again to generate another additional new feature. In an embodiment, the external input data 218 may be elicited based on the metadata associated with the input data 210. That is, the input data 210 may indicate where to pull the additional or external input data 218 from to join with the input data 210 to generate features. For example, the metadata associated with the input data 210 may indicate that external input data associated with the weather may need to be pulled from a weather server. This external input data 218 associated with the weather may provide columns of what the temperature was on specific days a customer makes online purchases. The pulling or request of information from a weather server, for instance, may be performed either prior to the input data 210 being processed by the semantics processor 212 or after. Moreover, the joining of the weather data from the external input data 218 and the input data 210 may, in some instances, be performed before the semantics processor 212 processes the data. Nevertheless, the additional or external input data 218 may be solicited to join with the input data 210 to generate additional features. In some instances, the semantics processor 212 may run the new data 214 again by receiving the new data 214 from the data store 216. In the alternative, and in some instances, the new data 214 may be directly sent to the semantics processor 212 for further or additional processing without first being stored in the data store 216. That is, by running the new data 216 again, in some instances, the semantics processor 212 may receive or request a portion or the entirety of the new data 216 to identify features and further generate additional features associated with the new data 216. Note that, the examples of types of data and what information are included in the columns of the input data are just illustrative examples and that multiple columns could be used and different types of features could be identified outside of online purchases, timestamps, and/or temperatures.

Figure 3:
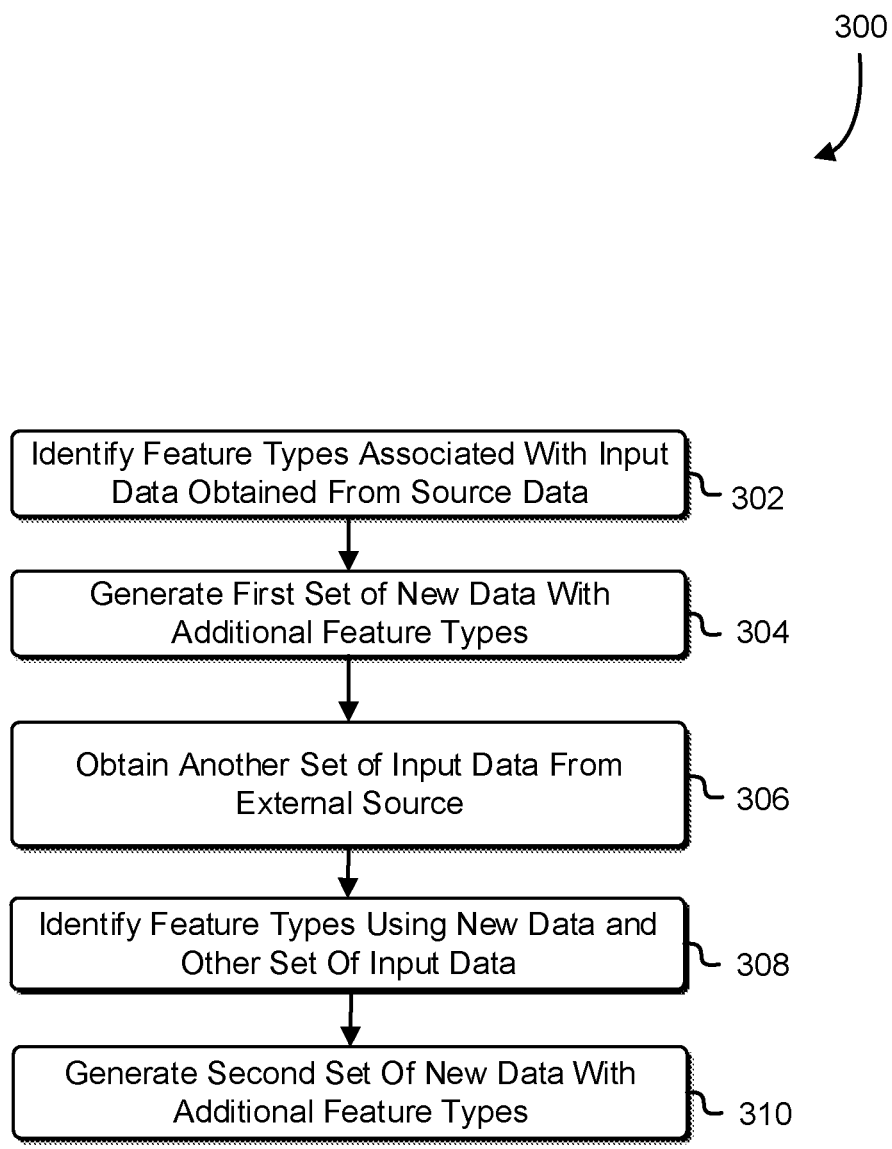
FIG. 3 illustrates an example process for processing input data to generate additional features and processing additional input data to generate more additional features.

FIG. 3 illustrates an example process 300 as described in connection with FIG. 2 for processing input data to generate additional features and processing additional input data to generate more additional features. That is, in 302, feature types associated with input data are identified. The input data may be obtained first by a processing service associated with a semantics processor or, in some instances, directly by the semantics processor. In an embodiment, the input data is obtained from source data from varying sources. In an embodiment, the input data is a stream of data (structured or unstructured, depending on the implementation). For example, the source data may come from a weather server, an online purchase research group's server, an external storage device such as a Universal Serial Bus (USB) device, unstructured or structured data (e.g., from sensors and/or other Internet of Things (IoT) device or groups thereof), or any server or storage device capable of storing, generating, and/or transferring data.

Once the feature types associated with the input data have been identified, a first set of new data may be generated 304 to include any additional features that were generated by the semantics processor. That is, the semantics processor, as described in connection with FIGS. 1-2, may parse the input data to identify features associated with the input data to generate a subset of the input data such that additional features are derived. The result of this is a new set of data that include, in some embodiments, the input data, the features originally identified for the input data, and/or the new additional features in any combination thereof as pertinent to the implementation.

As further illustrated in FIG. 3, in 306, additional or external input data may be obtained to join with the newly generated data. That is, for example, weather data from a weather server may be obtained such that the weather data (e.g., temperatures for each given day) are joined together with the new data pertaining to online purchases. The source and/or format of this data may be determined, in whole or in part, on the semantic context of input feature(s) and/or the derived new feature(s). Based on this semantic context, in some embodiments, an appropriate programmatic interface is identified, and the semantics processor generates one or more request(s) to the programmatic interface that includes information that cause the programmatic interface to provide appropriate data in return. For example, based on an input feature and semantic context associated with that feature (e.g., a column of integers that is semantically defined as a date), the system may derive a new feature with a different semantic context (e.g., temperature on that date), and based on that semantic context, identify an appropriate data source and/or API through which to retrieve the data (e.g., a weather API). In this example, the semantics processor forms the appropriate request(s) (e.g., get average temperature on day range 1 through n based on the values of the source feature and the desired data associated with the new feature), retrieves that data, and further processes the retrieved data into a format contextually usable in connection with that of the input data and/or the derived feature (e.g., into a tabular or other format to match up with the rows of data in the input data).

In 308, features using the new data and the additional or external input data (e.g., other set of data) may be identified and tagged to create a subset of the joined new data and the other set of data accordingly. Once the tagged subset is created, a second set or another new set of data is generated with even more features 310. For example, the weather data and the online purchases data are joined together and an additional feature such as the amount of times a customer makes a purchase during the warmest time of a day is generated. That is, now the second set of new data includes the original input data, the originally identified features pertaining to the input data, the first set new data and additional features pertaining to the first set of new data, and a second set of new set with additional features.

Figure 4:
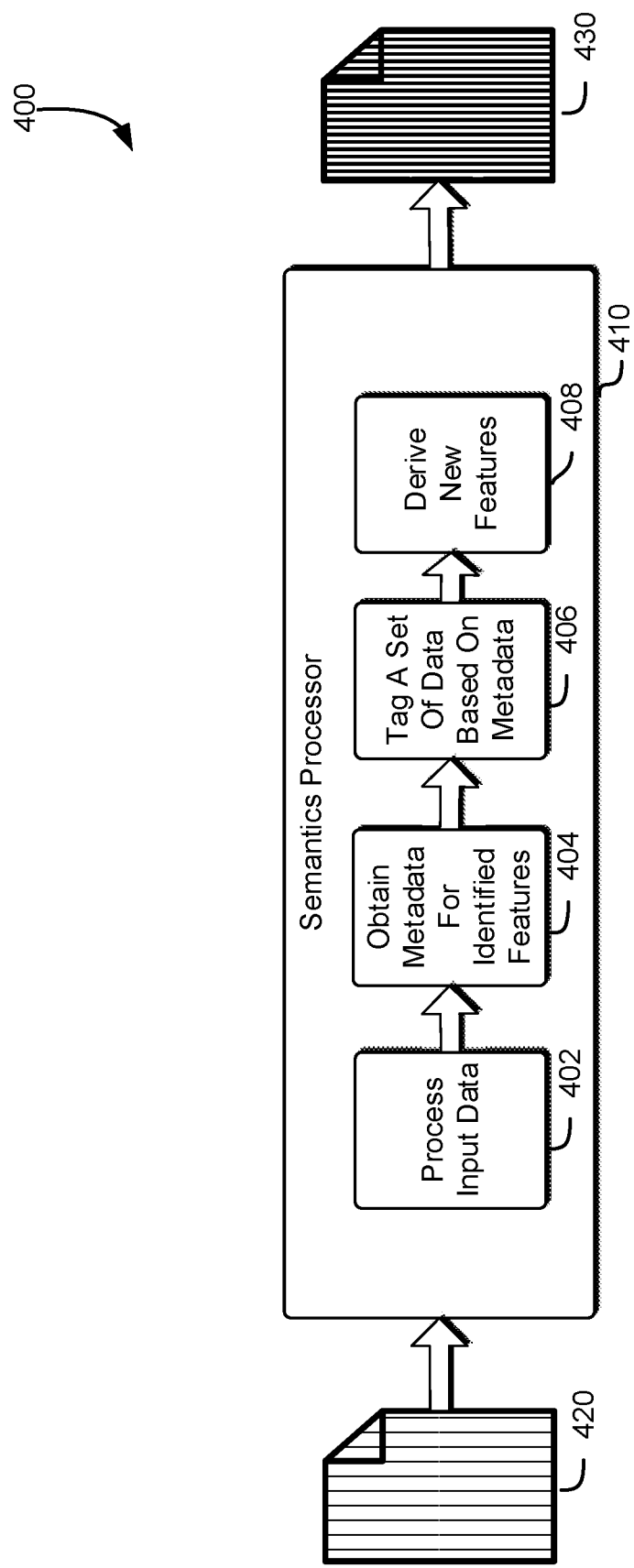
FIG. 4 illustrates an example environment where input data is processed via a semantics processor.

FIG. 4 illustrates an example environment 400 where input data is processed via a semantics processor 410. That is, in 402, the semantics processor 410 receives input data 420 with one or more columns of data and processes input data. As described in more detail above in connection with FIGS. 1-3, the semantics processor 410 processes input data (e.g., data from source files) from a variety of sources, servers, and/or storage services. More specifically, in 404, metadata for each feature that is identified from the input data may be obtained. Metadata may include information such as the semantic type. Thus, features can then be identified and tagged to form a subset 406 of the input data based at least in part on the metadata that includes information pertaining to semantic types. The subset of the input data may then be processed to generate or derive additional features accordingly. That is, based on the features with semantic context, one or more additional features for the input data may be generated, the one or more additional features also correspond to a semantic context that is in association with the semantic context of the subset of the input data. Ultimately, new data 430 may then be generated with these additional features and access to the new data 430 may be provided to one or more users in connection with a computing device.

As an example to illustrate the process 400 of FIG. 4, below is an insurance policy table with six columns or fields and the metadata (subsections of each of the six fields) associated with the table:

1. Policy_ID
    a. Semantic Type: ID
2. Quote_timestamp
    a. Semantic Type: Timestamp
3. Policy_purchase_timestamp
    a. Semantic Type: Timestamp
4. Monthly_premium
    a. Semantic Type: Currency
    b. Unit: USD
5. Cancellation_timestamp
    a. Semantic Type: Timestamp
    b. KPI_Derived: True
    c. Allow_nulls: True
6. Is_Active_Account?
    a. Semantic Type: Boolean
    b. KPI: True
    c. Good_Value: "True"

Figure 5:
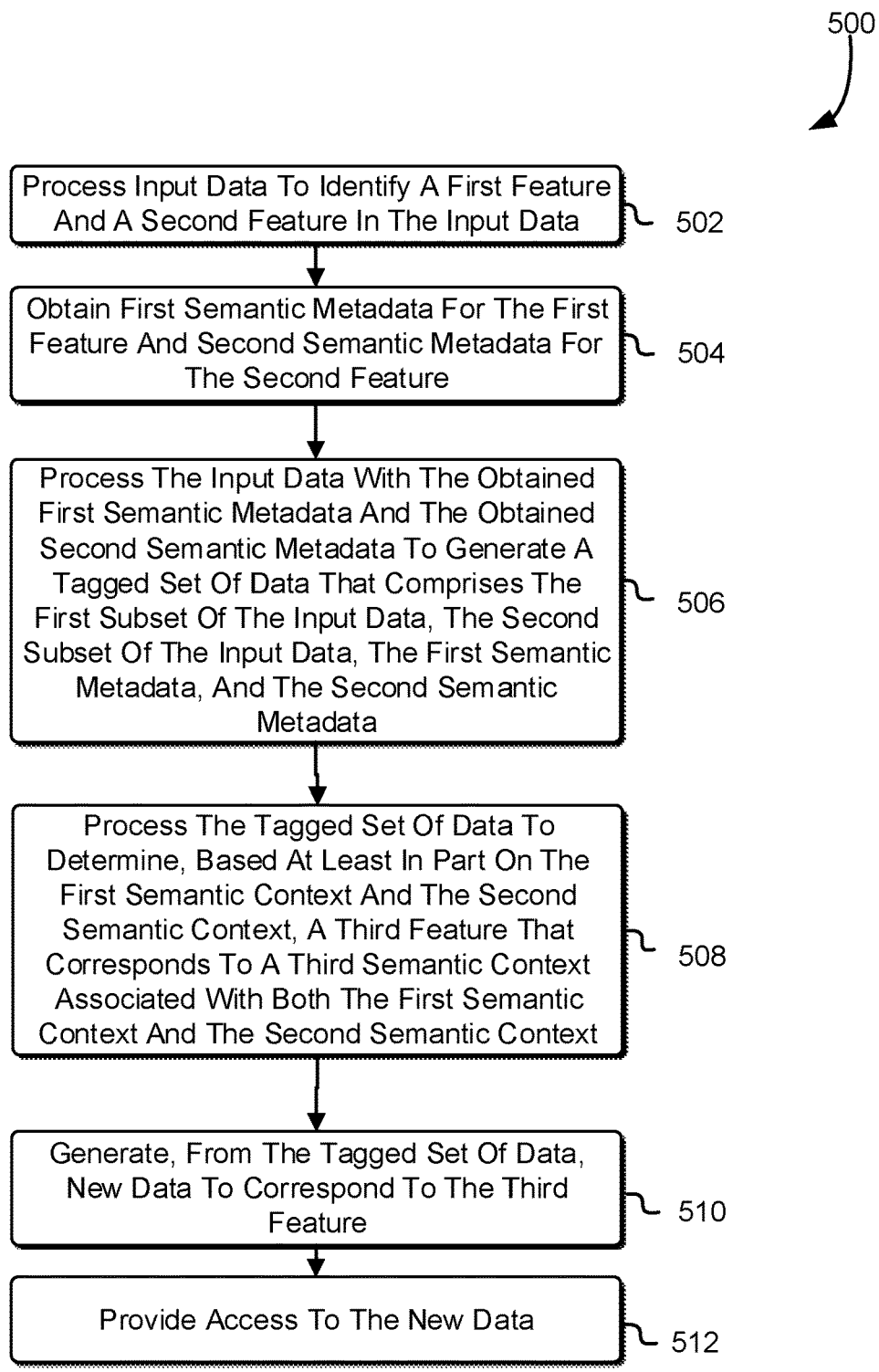
FIG. 5 illustrates an example process for processing input data to generate additional features.

Based on those six columns or fields, the semantics processor 410 may generate the following fields of additional information:

1. Quote_to_policy_purchase_period
    a. Policy_purchase_timestamp—Quote_timestamp
    b. Derived_from: policy_purchase_timestamp, quote_timestamp
    c. Semantic_type: period
2. Quote_to_cancellation_period
    a. Cancellation_timestamp—Quote_timestamp
    b. Null if quote_timestamp is null
    c. Marked as being KPI_Derived since one of its constituents was KPI_Derived
    d. Derived_from: quote_timestamp, cancellation_timestamp
    e. Semantic_type: period
    f. Unit: Seconds (assuming timestamp precision is seconds)
3. Policy_purchase_to_cancellation_period
    a. Cancellation_timestamp—Quote_timestamp
    b. Null if quote_timestamp is null
    c. Marked as being KPI_Derived since one of its constituents was KPI_Derived
    d. Derived_from: cancellation_timstamp, policy_purchase_timestamp
    e. Semantic_type: period
4. Quote_minute_of_day
    a. Just the time component of the quote_timestamp
    b. Semantic_type: Minute_of_day
    c. Derived_from: quote_timestamp
5. Quote_part_of_day
    a. Morning/Afternoon/evening/night
    b. Semantic_type: Part of day
    c. Derived_from: quote_timestamp
6. Quote_weekday?
    a. Is the day a weekday?
    b. Semantic_type: Boolean
    c. Derived_from: quote_timestamp
7. Quote_day_of_week_int
    a. 0-6 where each number represents a day of the week
    b. Semantic_type: Ordinal Day of Week
    c. Derived_from: quote_timestamp
8. Quote_month
    a. 0-11 where each integer represents a month of the year
    b. Semantic_type: Ordinal Month
    c. Derived_from: quote_timestamp
9. Quote_year
    a. Ex. 2018
    b. Semantic_type: Year
10. Derived_from: quote_timestampQuote_days_from_epoch
    a. Integer count of days until or since an arbitrary date
    b. Semantic_type: Epoch_Date
    c. Derived_from: quote_timestamp
11. Quote_next_holiday
    a. Christmas/Easter/Labor Day etc
    b. Semantic_type: US Holiday
    c. Derived_from: quote_timestamp
12. Quote_days_to_next_holiday
    a. Integer count of days until the next holiday
    b. Semantic_type: Period
    c. Derived_from: quote_timestamp
    d. Unit: Day
13. Quote_during_workday?
    a. Is it between 8 am and 5 pm mon-fri
    b. Semantic_type: Boolean
    c. Derived_from: quote_timestamp
14. <Repeat 11-21 for policy_purchase and cancellation>
15. Cancellation_timestamp_is_null?
    a. Boolean for if that timestamp is null since we chose to allow nulls for it.
    b. Semantic_type: Boolean
    c. Derived_from: cancellation_timestamp FIG. 5 illustrates an example process 500 for processing input data to generate additional features for new data. In 502, a system, such as a computing environment as described in connection with FIG. 1, may use a semantics processor to process input data to identify a first feature and a second feature in the input data. The semantics processor may be part of the computing system environment by running on a computing device connected to other devices or the semantics processor may be separate from a computing system environment and running on a virtual machine hosted by a computing resource service provider. In an embodiment, the semantics processor may be the system itself. In an embodiment, the semantics processor may identify, based on a semantic context, a programmatic interface to retrieve additional data associated with the features. The semantics processor or a separate device associated with the computing environment may then retrieve the additional data via the programmatic interface and further cause the system to generate the new data based at least in part on the retrieved additional data.

In an embodiment, the first feature and the second feature respectively correspond to a first subset of the input data and a second subset of the input data. Moreover, in an embodiment, the first subset of input data may have a first semantic type and the second subset of input data may have a second semantic type. For example, a semantic type may indicate that a column of information is a "Product Name." Specifically, a column of data or information may contain a list of all the products that a customer purchased and the semantic type for that column may be indicated as the "Product Name." In some instances, the first semantic type is identical to the second semantic type. In other instances, the first semantic type is different from the second semantic type.

Moreover, as further illustrated in FIG. 5, in 504 the system may cause a semantics processor to obtain a first semantic metadata for the first feature and a second semantic metadata for the second feature. In an embodiment, the first and the second semantic metadata respectively indicate information about a first semantic context and a second semantic context for the first feature and the second feature respectively. In some instances, the system uses the semantics processor so that the first feature is derived from the input data as a result of the input data having been processed with other semantic metadata associated with a different feature.

In 506, the system in connection with a semantics processor may then process the input data with the obtained first semantic metadata and the obtained second semantic metadata to generate a tagged set of data. The tagged set of data may comprise of the first subset of the input data, the second subset of the input data, the first semantic metadata, and the second semantic metadata. The tagged set of data may also include an identifier to identify this tagged set of data. A user (e.g., data scientist) in connection with a computing device may direct instructions to perform additional operations on a tagged set of data by identifying which subset of input data that should be run through the semantics processors to derive additional features.

In 508, the system in connection with a semantics processor may process the tagged set of data to determine, based at least in part on the first semantic context and the second semantic context, a third feature. The third feature may correspond to a third semantic context associated with both the first semantic context and the second semantic context.

In 510, the system in connection with a semantics processor may generate, from the tagged set of data, new data to correspond to the third feature. In some instances, the new data may be generated by processing the tagged set of data with the third semantic context. In an embodiment, the system may tag the new data with third semantic metadata associated with the third semantic context. The third semantic metadata may comprise of a third semantic type corresponding to the third semantic context. In an alternate embodiment, the third semantic metadata may also comprise an indication of mutual information between the third feature and at least one of the first feature and the second feature. Mutual information may be a measure of the mutual dependence between the two features. Additionally, in 512, the access to the new data may then be provided. Note that in the example process 500 of FIG. 5, additional features and metadata associated with any additional features may be identified beyond just the three features indicated in the description pertaining to FIG. 5.

Figure 6:
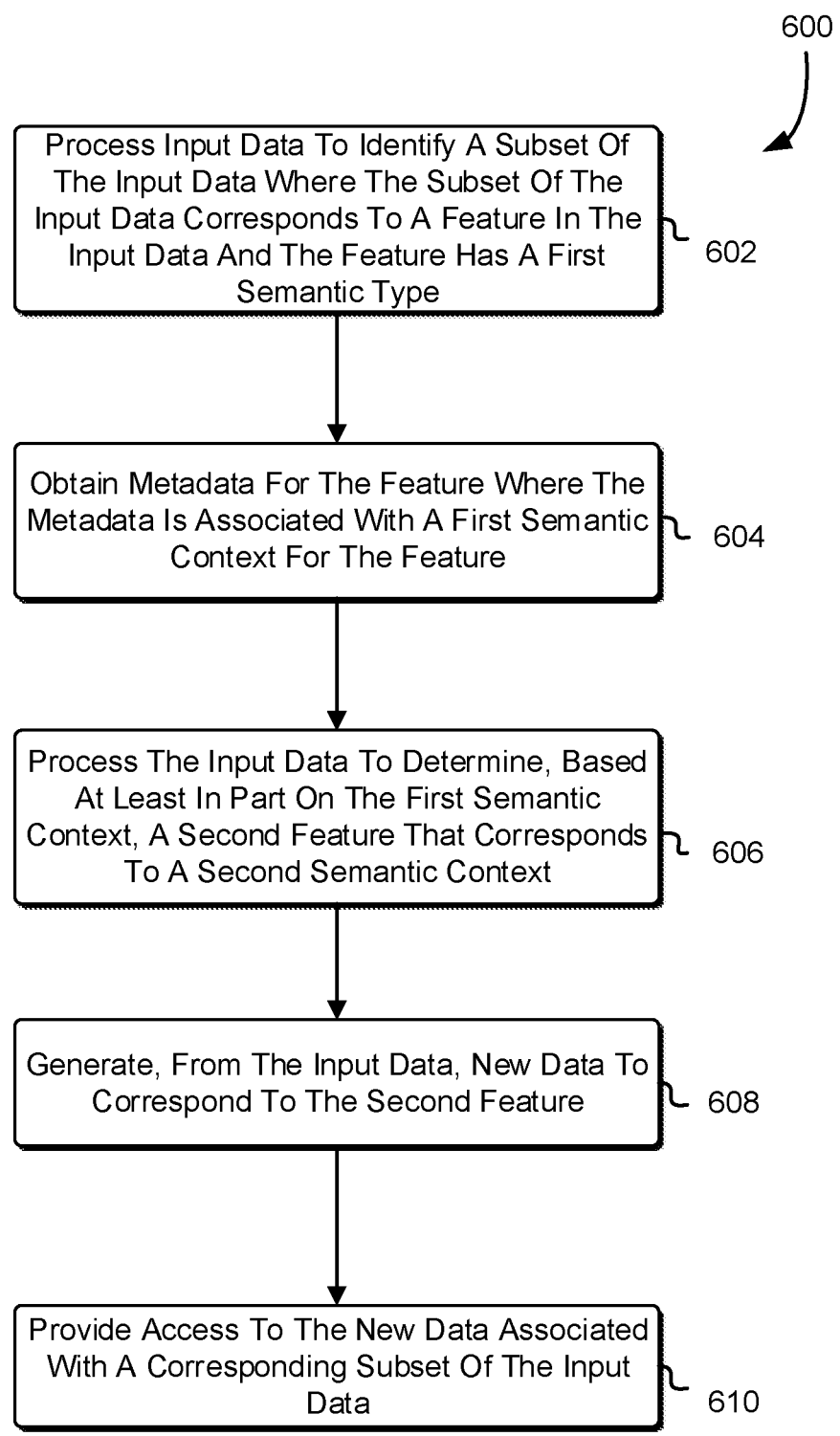
FIG. 6 illustrates an alternate example process for processing input data to generate additional features.

FIG. 6 illustrates an alternate example process 600 for a system utilizing a semantics processor, for instance, to process input data to generate additional features. In some instances, the system may be a third party system running the example process 600. In 602, the system may process input data to identify a subset of the input data where the subset of the input data corresponds to a feature in the input data. The feature may include a first semantic type or semantic identifier to describe or define the input data.

In 604, the system may cause the semantics processor to obtain metadata for the feature. The metadata may be associated with a first semantic context for the feature. In an embodiment, the metadata identifies the first semantic context. The metadata may be heuristically determined based at least in part on the identified subset of the input data.

In 606, the system may cause the semantics processor to process the input data to determine, based at least in part on the first semantic context, a second feature that corresponds to a second semantic context. The second feature, in some instances, may be determined by the system based on information other than the first semantic context. In 608, the system may generate, from the input data, new data to correspond to the second feature. The new data may be generated to include an identifier for the second feature based at least in part on other metadata. Additionally, in 610, the system may provide access to the new data as associated with a corresponding subset of the input data. In an embodiment, the system may provide access to the new data by processing it through or applying a machine learning algorithm to the new data. In an embodiment, the system may have a different computer system to process the new data after providing access to the new data. In an embodiment, after the new data is generated, the system may determine the second feature using an algorithm identified in a policy as applicable to the feature.

Figure 7:
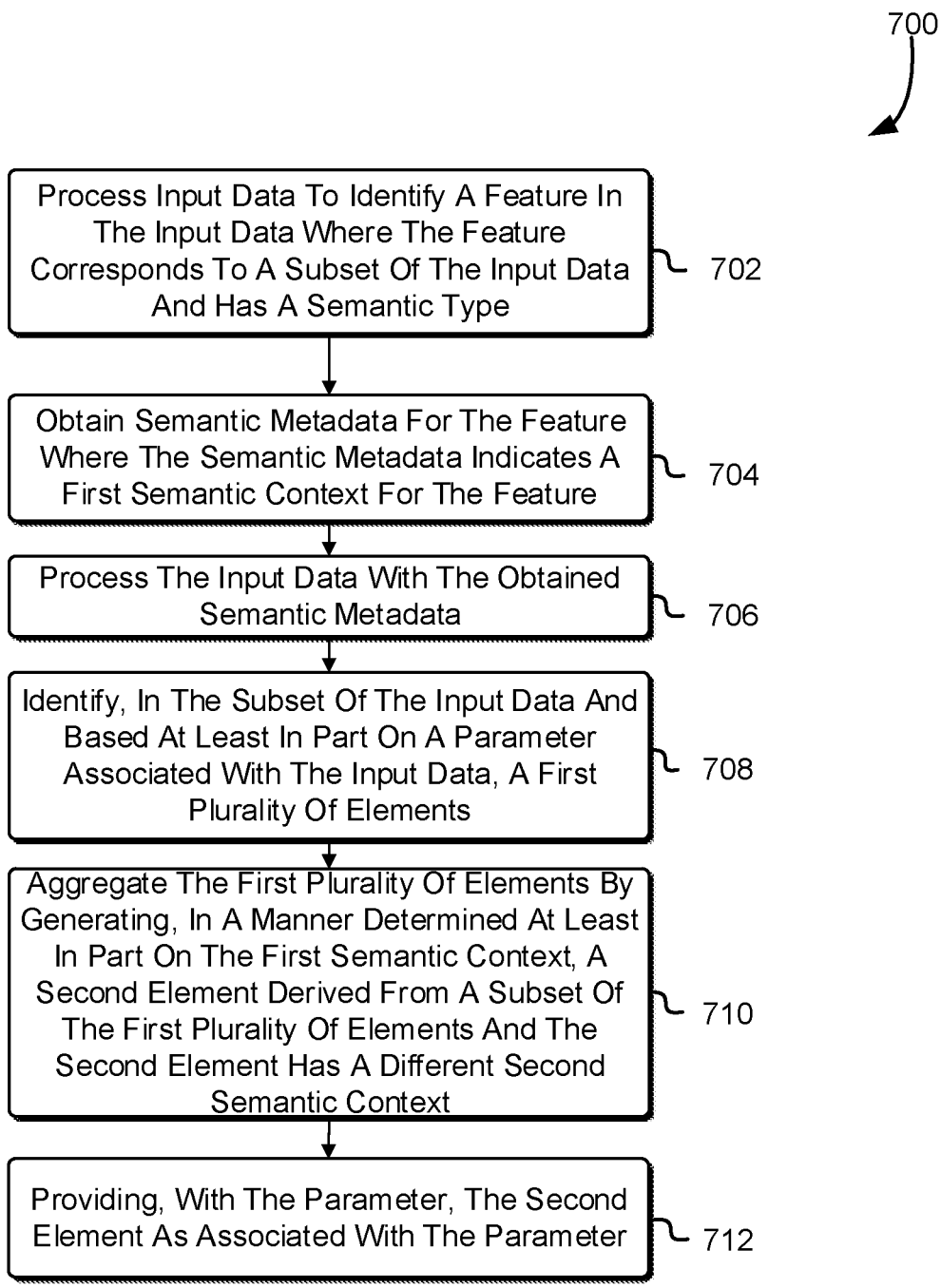
FIG. 7 illustrates an example process for generating elements for input data.

FIG. 7 illustrates an example process 700 for a system in connection with a semantics processor, when performing a computer-implement method, to generate elements for input data. As shown in FIG. 7, in 702, the system may process input data to identify a feature in the input data. In an embodiment, the feature may correspond to a subset of the input data and the subset of the input data may include a semantic type.

In 704, the system may cause the semantics processor to obtain or extract semantic metadata for the feature. The semantic metadata may indicate a first semantic context for the feature. In 706, the system may process the input data with the obtained semantic metadata using a semantics processor by applying one or more semantic algorithms to derive features. Semantic algorithms generally consist of algorithms that know how to derive new data feature(s) from a plurality of features based on the semantic types of data. In another instance, semantic algorithms may also consist of algorithms that know how to derive new data feature(s) from a given syntax of data being automatically applied to a given feature because of the declaration of the semantic and/or type of a feature. In some instances, semantic algorithms may be generated by explicit instructions from human input as well.

In 708, the system may cause the semantics processor to process input data based on the parameter(s) associated with the input data. That is, the input data may contain the parameter(s) that specifies an argument that could be passed in with the request to determine how to aggregate the data. For example, a request to aggregate data may be received and the parameter associated with the request may identify that all semantic types pertaining to "policy ID" are to be aggregated. In an embodiment, the parameter also identifies the manner for which to aggregate the subset of the input data pertaining to the data with semantic type "policy ID". Based on this parameter and the subset of the input data, the system may identify a first plurality of elements.

In 710, the system may cause the semantics processor to aggregate the first plurality of elements by generating, in a manner determined at least in part on the first semantic context, a second element. In an embodiment, the manner is determined based at least in part on the parameter and/or the first semantic context and a second semantic context corresponding to a different feature in the input data. The second element may be derived from a subset of the first plurality of elements that has a different second semantic context. Additionally, in 712, the system may provide, with the parameter, the second element as associated with the parameter.

Note that, the example processes 500, 600, and 700 as described in connection with FIGS. 5-7 respectively may be implemented by a semantics processor in any order and that the steps and examples provided in the description of those steps may not be the only order that is processed by the semantics processor to achieve the same result. That is, for example, the semantics processor may, in some instances, receive from another computing device a tagged subset of data ready to derive additional features. Thus, the steps of 502-506, for example, in connection with FIG. 5 may be skipped or not performed by the semantics processor before additional features in new data are generated as described in steps 508-510.

Figure 8:
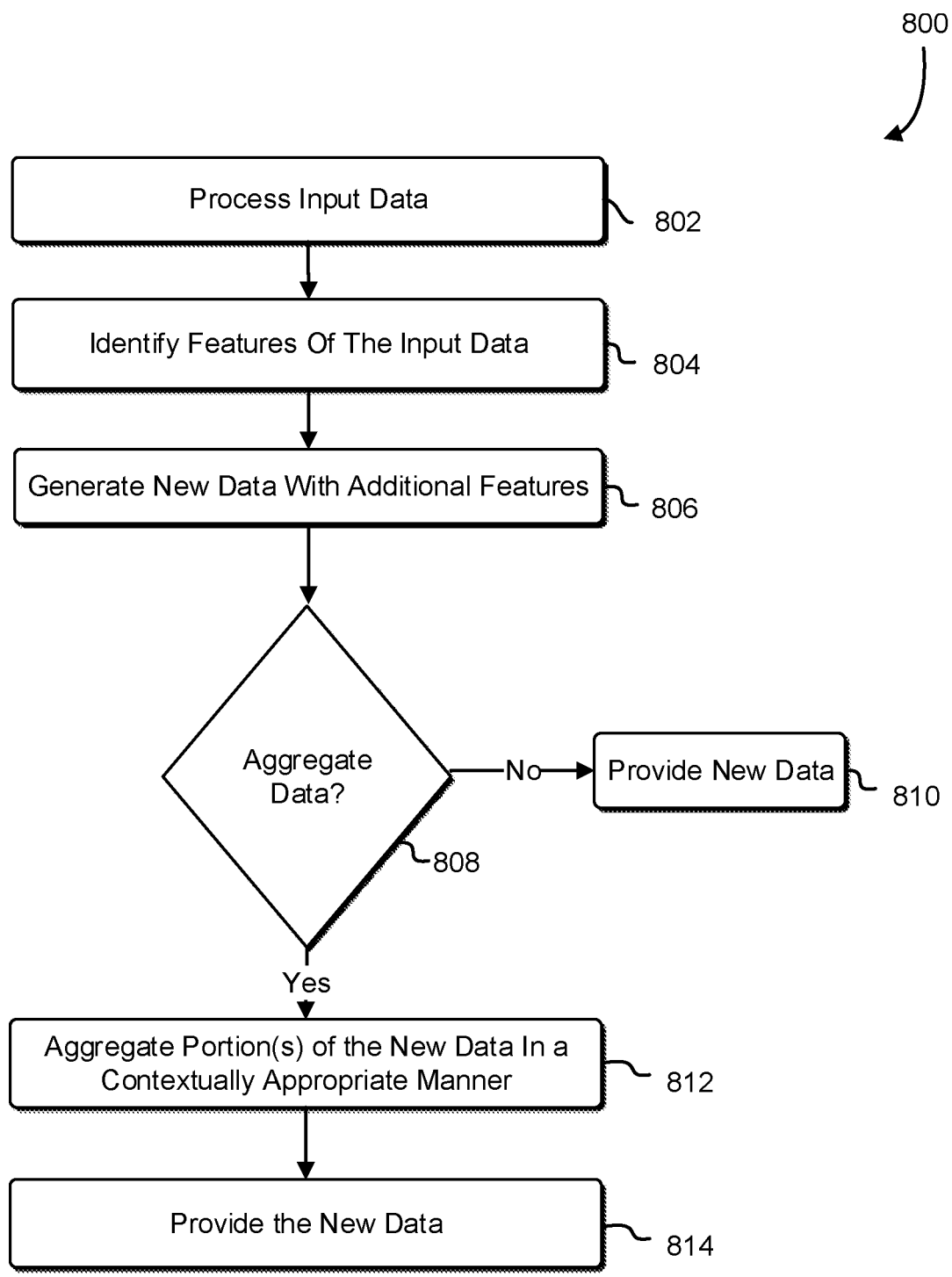
FIG. 8 illustrates an example process for aggregating or pivoting features generated from the input data.

FIG. 8 illustrates an example process 800 for aggregating or pivoting new data with additional features. In an embodiment, a system may process input data 802 as described in connection with FIGS. 1-7. The input data may include features associated with the input data that are identified 804. Moreover, the input data is then processed to generate new additional features to generate new data 806. After the new data is generated, the system may decide whether to join multiple datasets of input data together and automatically aggregate columns in one or more of those datasets based on rules defined for the semantic types of that data. The datasets may be extracted from one or more files. For example, the new data generated may include information about online purchase orders for a customer and based on predefined user-defined policies or system configurations, the system may aggregate and join the new data associated with weather from a weather server together to generate even more features. The user-defined policies may be policies associated with the system, defined as part of a request for processing input data, administered by a policy management system, service of a computing resource service provider, and/or as part of the semantic processor.

The request to join the datasets together may include a parameter that specifies which features (e.g., semantic types) to aggregate and the manner in which to generate additional features. As an example, a feature of a dataset is "car model year." The system identifies that for each "policy id" in the dataset there is an indeterminate number of cars, and thus the car model years associated with them. Thus, to aggregate, the aggregation may indicate "year" and, in some instances, it would not make sense to aggregate or add the integers that are in the columns pertaining to "years" together. Thus, the system may parse through the parameter, user-defined policies, and/or some combination thereof, to identify certain rules and if the rules indicate that if the semantic type is "years," then the aggregation is to average the car model years. The result of this is an additional feature in new data with the additional feature pertaining to the "average year of the car model per policy."

In an embodiment, a simple case of aggregating the datasets may be that of a car insurance policy included in the new data may be joined with data related to cars on those policies and when the two datasets are aggregated, the sum of the all car values and the average of all car values may be generated as new features. Hence, new data containing these new features 810 may be provided to another computing device for a data scientist to analyze accordingly.

As an example of the aggregate process 808, a second file containing datasets that pertain to vehicles, with the following columns and declarations may be added to the new data:
1. vehicle_id
    a. Semantic Type: ID
2. Policy_id
    a. Semantic Type: Foreign Key
    b. Target: Policies
3. Make
    a. Semantic Type: Brand
4. Model
    a. Semantic Type: Product Name
5. Year
    a. Semantic Type: Year
6. Doors
    a. Semantic Type: Count
7. Style
    a. Semantic_Type: Categorical_Small
8. Original_Price
    a. Semantic Type: Currency
    b. Unit: USD
9. Current_value
    a. Semantic Type: Currency
    b. Unit: USD By adding this vehicle dataset, the system may run the semantics processor again and the processor may automatically join the vehicle data to the policy data. In another embodiment, the system may cause the semantics processor to extract metadata from the input data and identify the rules on how to handle the joining of datasets and/or pivoting and aggregation within one or both. Further, this might be limited to aggregation or pivoting within a single file rather than a pair. The system may make a decision as to joining the datasets by either aggregating the data and/or pivoting as well to make the cardinality of the files match (i.e. aggregate cars on policies so that its cardinality is based on policies just as the policies data is). In some instances, if the system pivots, there may be some limitations on the number of pivot columns that may be processed. As an example, the system may choose to pivot and limit it to three vehicles of pivot. In that case the resulting data would include everything shown in the above example for the basic policy table plus the following columns:
1. <Repeats 3 times>
    a. <Vehicle>_<#>_make
        i. Semantic Type: Brand b. <Vehicle>_<#>_model
   i. Semantic Type: Product Name
c. <Vehicle>_<#>_year
   i. Semantic Type: Year
d. <Vehicle>_<#>_doors
   i. Semantic Type: Count
e. <Vehicle>_<#>_style
   i. Semantic_Type: Categorical_Small
f. <Vehicle>_<#>_original_price
   i. Semantic Type: Currency
   ii. Unit: USD
g. <Vehicle>_<#>_current_value
   i. Semantic Type: Currency
   ii. Unit: USD
h. <Vehicle>_<#>_original_price_less_current_value
   i. Original price minus the current value
   ii. Semantic Type: Currency
   iii. Unit: USD
   iv. Derived_From: Vehicle_<#>_original_price, Vehicle_<#>_current_value
   v. Scale_column: <Vehicle>_<#>_original_price
i.
   <Vehicle>_<#>_current_value_to_original_price_ratio
   i. Ratio of the current value over the Original price
   ii. Semantic Type: Percentage
   iii. Derived_From: Vehicle_<#>_current_value, Vehicle_<#>_original_price
j. <Vehicle>_<#>_original_price_per_door
   i. Original price divided by door count
   ii. Semantic Type: Currency
   iii. Unit: Dollars
   iv. Derived_from: Vehicle_<#>_original_price, Vehicle_<X>_doors
k. <Vehicle>_<#>_current_value_per_door
   i. Current price divided by door count
   ii. Semantic Type: Currency
   iii. Unit: Dollars
   iv. Derived_from: Vehicle_<#>_current_value, Vehicle_<X>_doors
1. vehicle_count
   a. Integer counting how many vehicles each policy had
   b. Semantic Type: Count
2. <for every make represented in the vehicles list>
   a. vehicle_<make>_count
      i. Semantic Type: Count
      ii. Integer count of how many cars of that make the policy has
3. <for every model represented in the vehicles list>
   a. vehicle_<model>_count
      i. Semantic Type: Count
      ii. Integer count of how many cars of that model the policy has
4. vehicle_earliest_year
   a. Year of the oldest vehicle
   b. Semantic Type: Year
5. vehicle_newest_year
   a. Year of the newest vehicle
   b. Semantic Type: Year
6. vehicle_average_year
   a. Average year of the vehicles
   b. Semantic Type: Year
7. Vehicle_door_average
   a. Average number of doors per vehicle
   b. Semantic Type: Count
8. Vehicle_door_sum
   a. Total number of doors amongst all vehicles
   b. Semantic Type: Count
9. <for each style represented in the vehicles list>
   a. vehicle_<style>_count
      i. How many vehicles of this style did the policy have
      ii. Semantic Type: Count
10. Vehicle_original_price_sum
    a. Sum of all the original prices
    b. Semantic Type: Currency
    c. Unit: USD
11. Vehicle_original_price_min
    a. Cheapest original price
    b. Semantic Type: Currency
    c. Unit: USD
12. Vehicle_original_price_max
    a. Most expensive original car
    b. Semantic Type: Currency
    c. Unit: USD
13. Vehicle_original_price_avg
    a. Average original car price
    b. Semantic Type: Currency
    c. Unit: USD
14. Vehicle_current_value_sum
    a. Sum of all the current values
    b. Semantic Type: Currency
    c. Unit: USD
15. Vehicle_current_value_min
    a. Cheapest current value
    b. Semantic Type: Currency
    c. Unit: USD
16. Vehicle_current_value_max
    a. Most expensive current value
    b. Semantic Type: Currency
    c. Unit: USD
17. Vehicle_current_value_avg
    a. Average current value
    b. Semantic Type: Currency
    c. Unit: USD
18. Vehicle_original_price_less_current_value_sum
    a. Semantic Type: Currency
    b. Unit: USD
19. Vehicle_original_price_less_current_value_min
    a. Semantic Type: Currency
20. Unit: USDVehicle_original_price_less_current_value_max
    a. Semantic Type: Currency
    b. Unit: USD
21. Vehicle_original_price_less_current_value_avg
    a. Semantic Type: Currency
    b. Unit: USD The result of a joining operation with pivots greatly expands the dataset with additional information. In the example provided above, the system identifies features and derived features on the vehicles table itself. The system then aggregated and joined the datasets pertaining to the vehicles based on the semantic type declarations themselves. The following are some examples of semantic type declarations indicated above:

1. Type: ID
   a. Base Type: Integer
   b. Not_analytically_useful: true
   c. Allow_nulls: false
   d. Aggregations: [ ]
   e. Processors: None
   f. Compare_type: None
2. Type: Timestamp
   a. Base Type: String
   b. Normalization: ISO8601 c. Allow_nulls: false
  d. Compare_type: Difference
  e. Processors: [DateFromTimestamp, MinuteOfDayFromTimestamp, SecondsFromEpochFromString]
  f. Aggregations: [Average]
3. Type: SecondsFromEpoch
  a. Base Type: Integer
  b. Compare_type: Difference
  c. Unit: Seconds
4. Type: Date
  a. Base Type: Date
  b. Processors: [EpochDateFromDate]
5. Type: Epoch_Date
  a. Base Type: Integer
  b. Note for document reviewers: EpochDate is a custom format for us that is days since Jan 1st, 1970 (the unix epoch). This is far more useful than human date strings.
  c. Compare_type: Difference
  d. Unit: Days
  e. Processors: [EpochDateToWeekday, EpochDateToDayOfWeek, EpochDateToMonth, EpochDateToYear, EpochDateToNextHoliday. EpochDateToDaysToNextHoliday]
6. Type: MinuteOfDay
  a. Base Type: Integer
  b. Compare_type: Difference
  c. Unit: Minutes
  d. Processors: [MinuteOfDayToPartOfDay]
7. Type: Boolean
8. Type: Currency
  a. Base Type: Decimal
  b. Requires_unit: True
  c. Aggreagations[Sum, Average, Percentage, Min, Max]

FIG. 9 illustrates an example dataset 900 illustrating features and additional features associated with the dataset (e.g., input data) generated by a system in connection with a semantics processor. For example, input data may include columns pertaining to timestamps and zip codes of customers who purchase an automobile insurance policy. By selecting or identifying features of the columns to tag, a subset of the input data may be generated. The subset of the input data may then be sent to a semantics processor, for example, to generate or derive additional features. For example, "Column X: Timestamp" may be identified along with "Column Y: Zip Code" and the two columns may be tagged to create the subset of data. The subset of data may then be processed by the semantics processor to derive additional feature, such as the temperature of the weather at a specific time (e.g., timestamp) and place (e.g., zip code). In some instances, the system may identify that the exact same columns with the same features may not be tagged to generate a subset and the system may return a NULL value or will fail to process the two columns for additional features. In some instances, for two features of the same type, it does not necessarily imply that the two features of the same type or semantic context result in no derived features but some other feature may be derived.

As another example, the system in connection with the semantics processor may derive new features using only one feature instead of two or more. That is, a semantic type pertaining to "year" can be the sole feature and the derived feature or features may be "number of years elapsed." In another example, the sole feature of a column may be "dates" and the derived feature may the "month of the year." The feature or features derived from the sole feature may, in some instances, be of different semantic types as well.

Figure 10:
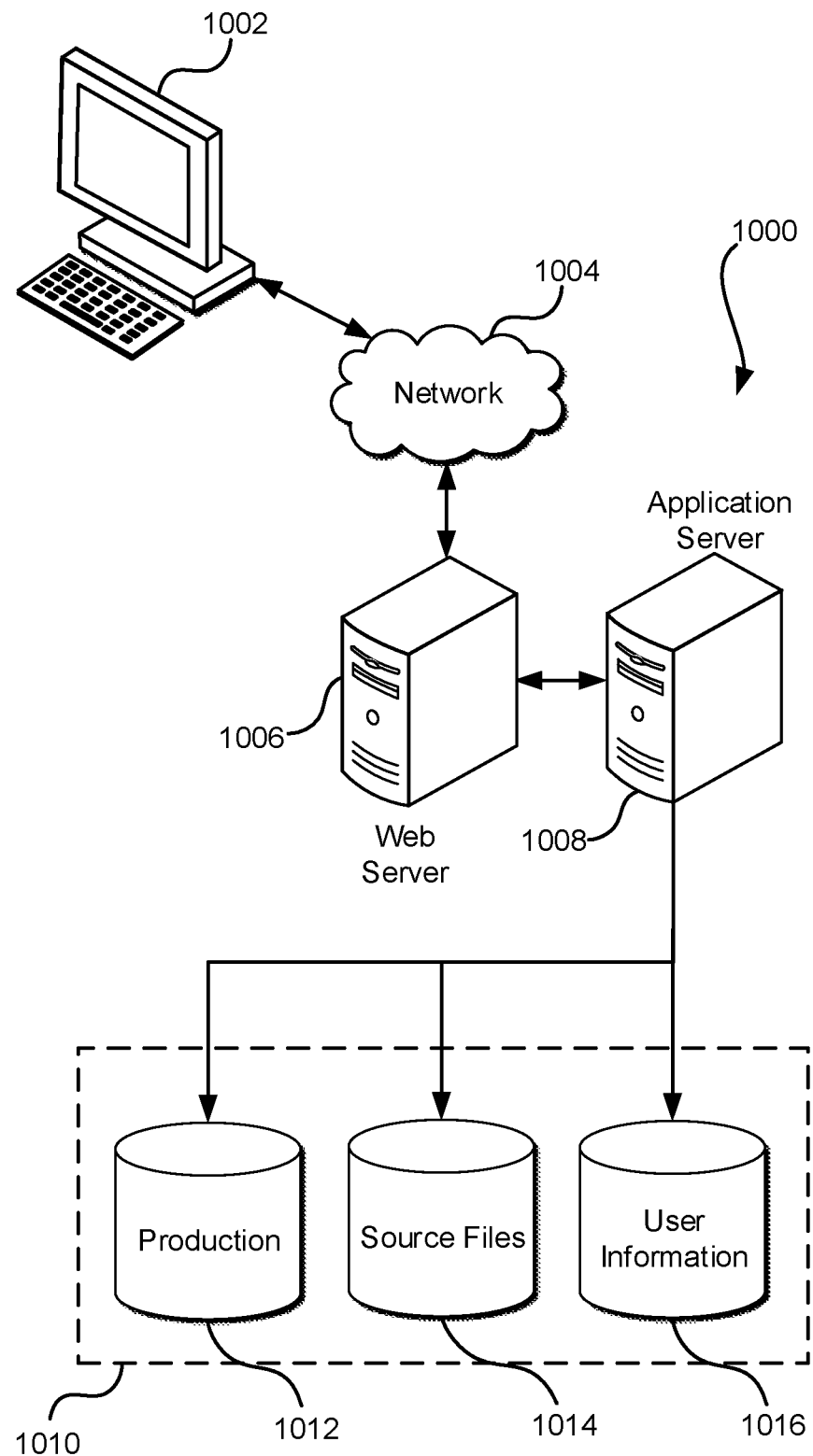
FIG. 10 illustrates a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing source files 1014, which is used, in an embodiment, for analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto and the application server 1008 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage a plurality of source files.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers may include, without limitation, those commercially available from Oracle®, Microsoft®, Sybase®, and IBM® as well as open-source servers such as MySQL, Postgres, SQLite, MongoDB, and any other server capable of storing, retrieving, and accessing structured or unstructured data.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    one or more processors; and
    memory that stores computer-executable instructions that, if executed, cause the one or more processors to:
        process input data to identify a first feature and a second feature in the input data, the first feature and the second feature respectively corresponding to a first subset of the input data and a second subset of the input data, the first subset of input data having a first semantic type and the second subset of input data having a second semantic type;
        obtain first semantic metadata for the first feature and second semantic metadata for the second feature, the first and the second semantic metadata respectively indicating a first semantic context and a second semantic context for the first feature and the second feature;
        process the input data with the obtained first semantic metadata and the obtained second semantic metadata to generate a tagged set of data comprising the first subset of the input data, the second subset of the input data, the first semantic metadata, and the second semantic metadata;
        process the tagged set of data to derive, based at least in part on the first semantic context and the second semantic context, a third feature corresponding to a third semantic context indicating an interdependent relationship of both the first semantic context and the second semantic context;
        generate, from the tagged set of data, new data to correspond to the third feature; and
        provide access to the new data.

2. The system of claim 1, wherein the instructions that, if executed, generate the new data, further cause the system to generate the new data by processing the tagged set of data with the third semantic context.

3. The system of claim 1, wherein the first semantic type is identical to the second semantic type.

4. The system of claim 1, wherein the first feature is derived from the input data as a result of the input data having been processed with other semantic metadata associated with a different feature.

5. The system of claim 1, wherein the instructions, if executed, further cause the system to tag the new data with third semantic metadata associated with the third semantic context.

6. The system of claim 5, wherein the third semantic metadata comprises a third semantic type corresponding to the third semantic context.

7. The system of claim 5, wherein the third semantic metadata comprises an indication of mutual information between the third feature and at least one of the first feature and the second feature.

8. The system of claim 1, wherein the instructions, if executed, further cause the system to:
identify, based on the third semantic context, a programmatic interface to retrieve additional data associated with the third feature;
send one or more requests to the identified programmatic interface to retrieve the additional data; and
generate the new data based at least in part on the retrieved additional data.

9. A computer-implemented method, comprising:
processing input data to identify a first feature and a second feature in the input data, the first feature and the second feature respectively corresponding to a first subset of the input data and a second subset of the input data, the first subset of input data having a first semantic type and the second subset of input data having a second semantic type;
obtaining first semantic metadata for the first feature and second semantic metadata for the second feature, the first and the second semantic metadata respectively indicating a first semantic context and a second semantic context for the first feature and the second feature;
processing the input data with the obtained first semantic metadata and the obtained second semantic metadata to generate a tagged set of data comprising the first subset of the input data, the second subset of the input data, the first semantic metadata, and the second semantic metadata;
processing the tagged set of data to derive, based at least in part on the first semantic context and the second semantic context, a third feature corresponding to a third semantic context that indicates an interdependency of both the first semantic context and the second semantic context;
generating, from the tagged set of data, new data to correspond to the third feature; and
providing access to the new data.

10. The computer-implemented method of claim 9, wherein the method further comprises generating the new data by processing the tagged set of data with the third semantic context.

11. The computer-implemented method of claim 9, wherein the first semantic type is identical to the second semantic type.

12. The computer-implemented method of claim 9, wherein the first feature is derived from the input data as a result of the input data having been processed with other semantic metadata associated with a different feature.

13. The computer-implemented method of claim 9, wherein the method further comprises tagging the new data with third semantic metadata associated with the third semantic context.

14. The computer-implemented method of claim 13, wherein the third semantic metadata comprises a third semantic type corresponding to the third semantic context.

15. The computer-implemented method of claim 13, wherein the third semantic metadata comprises an indication of mutual information between the third feature and at least one of the first feature and the second feature.

16. The computer-implemented method of claim 9, wherein the method further comprising:
identifying, based on the third semantic context, a programmatic interface to retrieve additional data associated with the third feature;
send one or more requests to the identified programmatic interface to retrieve the additional data; and
generating the new data based at least in part on the retrieved additional data.

17. A non-transitory computer-readable storage medium having stored thereon executable instructions that, as a result of being executed by one or more processors of a computer system, cause the computer system to at least:
process input data to identify a first feature and a second feature in the input data, the first feature and the second feature respectively corresponding to a first subset of the input data and a second subset of the input data, the first subset of input data having a first semantic type and the second subset of input data having a second semantic type;
obtain first semantic metadata for the first feature and second semantic metadata for the second feature, the first and the second semantic metadata respectively indicating a first semantic context and a second semantic context for the first feature and the second feature;
process the input data with the obtained first semantic metadata and the obtained second semantic metadata to generate a tagged set of data comprising the first subset of the input data, the second subset of the input data, the first semantic metadata, and the second semantic metadata;
process the tagged set of data to derive, based at least in part on the first semantic context and the second semantic context, a third feature corresponding to a third semantic context associated with information about a relationship of both the first semantic context and the second semantic context;
generate, from the tagged set of data, new data to correspond to the third feature; and
provide access to the new data.

18. The non-transitory computer-readable storage medium of claim 17, wherein the instructions, if executed, that process the input data, further cause the computer system to generate the new data by processing the tagged set of data with the third semantic context.

19. The non-transitory computer-readable storage medium of claim 17, wherein the first feature is derived from the input data as a result of the input data having been processed with other semantic metadata associated with a different feature.

20. The non-transitory computer-readable storage medium of claim 17, wherein the instructions, if executed, further cause the computer system to:
identify, based on the third semantic context, a programmatic interface to retrieve additional data associated with the third feature;

send one or more requests to the identified programmatic interface to retrieve the additional data; and generate the new data based at least in part on the retrieved additional data.

\* \* \* \* \*